United States Patent

[11] 3,568,823

| [72] | Inventors | Bruno Rettig<br>Ypsilanti;<br>William G. Lehman, Birmingham, Mich. |
|---|---|---|
| [21] | Appl. No. | 823,838 |
| [22] | Filed | May 12, 1969 |
| [45] | Patented | Mar. 9, 1971 |
| [73] | Assignee | Hydromation Engineering Company<br>Livonia, Mich. |

[54] STORAGE CONVEYOR
8 Claims, 3 Drawing Figs.

[52] U.S. Cl. .................................................. 198/189,
198/131, 198/183
[51] Int. Cl. .................................................. B65g 17/00
[50] Field of Search .......................................... 198/183,
189, 127, 131

[56] References Cited
UNITED STATES PATENTS

| 914,188 | 3/1909 | Robinson ..................... | 198/183 |
| 3,127,003 | 3/1964 | Goepper ..................... | 198/127 |

*Primary Examiner*—Richard E. Aegerter
*Attorney*—Settle, Batchelder and Oltman

ABSTRACT: Article handling apparatus utilizing an endless chain to move elongated article supporting rollers that are staggered to form article spaces and are also offset relative to each other to support the elongated articles at spaced points along their linear surface. The apparatus incorporates a gate mechanism that can be selectively actuated to stop the article while the chain continues to move and also to pass single articles when wanted.

3,568,823

STORAGE CONVEYOR

DISCLOSURE

This invention relates to improvements in article handling apparatus specifically adapted although not exclusively for conveying elongated articles.

Effective conveyance systems must move articles between stations without damaging the article and while consuming a minimum of power. If these articles are relatively elongated their chance of becoming misaligned during conveyance is considerably greater. To offset this, often additional support is provided and when this additional support involves relative movement between the support and some other structure there is additional power consumed due to the inherent friction. Often too, it is desirable to stop the passage of the articles and thereafter occasionally pass individual articles or groups of articles.

With the foregoing in mind new and different article handling apparatus is contemplated that can effectively support and maintain aligned elongated articles during their conveyance with a minimum number of movable support points.

Also contemplated is article handling apparatus that is uncomplicated, easily maintained and utilizes a minimum number of relatively conventional and commercially available parts. A further objective is the unique provision of a gate mechanism for stopping the articles while the drive continues and that also can pass a certain quantity of articles when wanted.

The foregoing and other objects and advantages of the invention will become apparent from the following description and from the accompanying drawings in which.

Figures 1, 2:
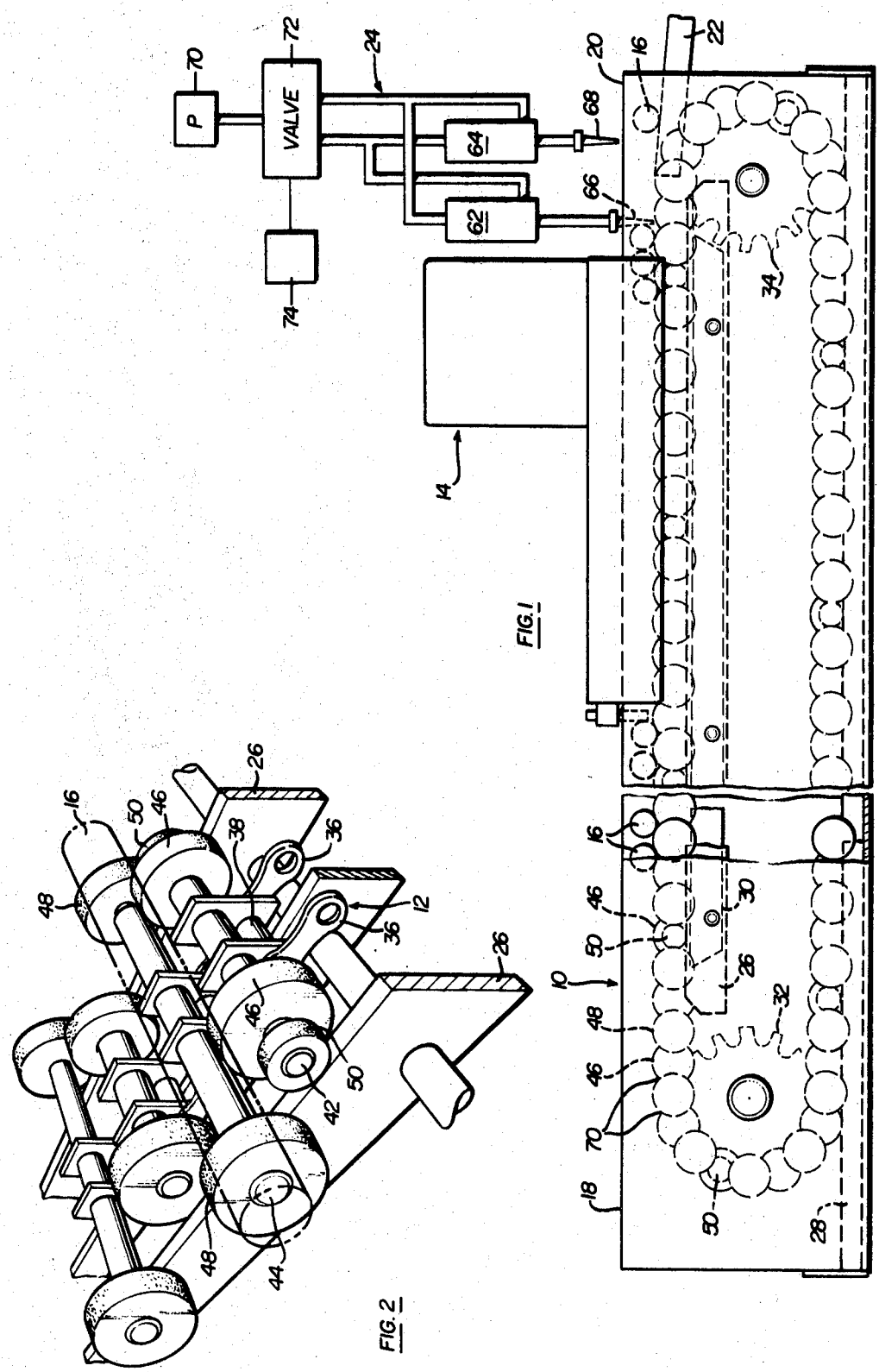
FIG. 1 is a side elevational view, partially schematic of article handling apparatus incorporating the principles of the invention.
FIG. 2 is a perspective view of part of the FIG. 1 apparatus.

Referring first to FIG. 1, the numeral 10 denotes an elongated frame 10 which supports an endless chain 12 best seen in FIG. 2. A drive mechanism shown generally at 14 revolves the chain 12 along a horizontal path so as to transport elongated articles 16 (see FIGS. 1 and 2) from a frame entrance end at 18 to a frame discharge end at 20. At the discharge end 20 is a suitable ramp 22 is positioned and articles 16 are discharged onto this ramp 22 unless and stopped by a gate mechanism denoted generally at 24.

Figure 3:
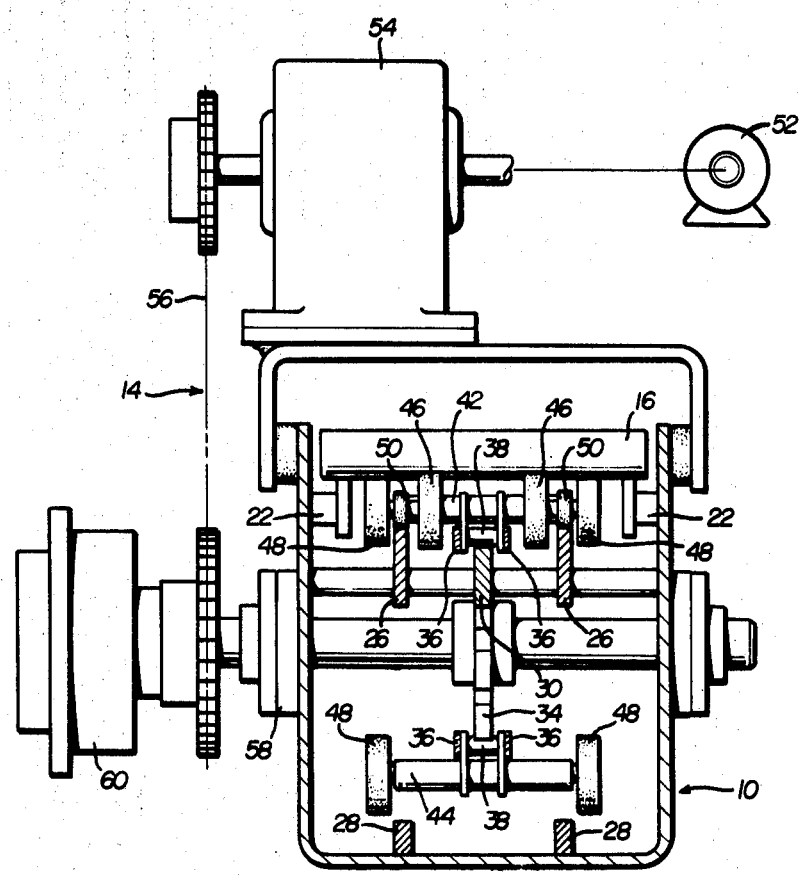
FIG. 3 is a sectional view taken in the direction of arrow 3—3 in FIG. 1.

The frame 10 as best illustrated in FIG. 3 has extending along its horizontal length spaced apart top side rails 26 and bottom spaced-apart side rails 28. Between these top side rails 26 the frame 10 provides a center rail 30 for the chain 12. Also the frame 10 revolvably supports respectively at the entrance end 18 and the discharge end 20 idler and drive sprockets 32 and 34. These drive sprockets 32 and 34 have the conventional teeth for engaging the spaces formed between adjacent links 36 of the chain 12 in a well known way. The chain's links 36 are joined by cross connecting members 38 which ride on the center rail 30 as depicted in FIGS. 2 and 3.

As best viewed in FIG. 2 the chain 12 has upstanding links 40 each of which at the top successively attaches to short and long shafts 42 and 44 and at the bottom to the cross connecting members 38 throughout the length of the chain 12. Revolvably supported on the opposite sides and adjacent the ends of the short shafts 42 are article support rollers 46 and on the opposite ends of the long shafts 44 are article supporting rollers 48. By having these shafts 42 and 44 alternately long and short the article rollers 46 and the article rollers 48 are axially offset from each other so as to provide four different support points that prevent the article 16 from cocking or becoming misaligned from the displayed FIG. 2 position in which each has its longitudinal axis parallel to the corresponding axes of the short and long shafts 42 and 44 and normal to the path of movement of the chain 12. Also and as can be observed in FIG. 1, this offset permits the overlapping of the rollers 46 with respect to the rollers 48. This increases the number of article carrying supports that can be provided within the total length of the chain 12.

Again referring to FIG. 2 support rollers 50 are shown revolvably attached to the opposite ends of one of the short shafts 42. These rollers 50 can be, and preferably are, roller bearings which are suitably attached to the ends of the shaft 42 and have their outer rails supportable on the frame side rails 26. As is shown in FIG. 1 not every one of the short shafts 42 has these support rollers 50. In this embodiment every fourth short shaft 42 has these rollers 50, i.e., there are three sets of rollers 46 between each set of support rollers 50. This number of course, can be varied depending upon the application of the apparatus. For example, if the parts are heavy and additional support is needed the rollers 50 can be added to others of the short shafts 42. By using a minimum of these rollers 50 friction losses are minimized even though the roller bearings present very little frictional resistance.

The drive mechanism 14 for the chain 12 displayed in FIG. 3 utilizes an appropriate motor 52, preferably electrically operated at conventional line power, and a suitable speed varying transmission 54 which is driven by the motor 52. The output of the transmission 54 through the agency of a belt, chain or the like type of drive 56 transfers power to the drive sprocket 34 through a suitable coupling 58. The coupling 58 may incorporate a suitable clutch mechanism shown generally at 60 to clutch and declutch the drive sprocket 34 to the drive 56. One such suitable clutch is the commercially available Ferguson Right-Torque Clutch AS–60.

Now describing the gate mechanism 24 shown in FIG. 1 two stop motors 62 and 64 are positioned near the frame discharge end 20 either on the frame 10 or in some other suitable way so that the space between respective tapered stop ends 66 and 68 will in the embodiment correspond to the diameter of the article 16. The stop motors 62 and 64 can be pressure actuated double acting motors such that pressure fluid is supplied to one end while the opposite and end is exhausted to either feed or retract the stop end. The pressure fluid for the stop motors 62 and 64 can be supplied by a conventional pump 70 through the intermediary of a valve 72 that is selectively actuatable by a handle 74 to give a sequence of events to be explained.

Assuming first that the valve 72 is positioned so that both stop motor ends 66 and 68 are in their retracted upper positions out of the path of the moving articles 16, if it is desired now to stop the flow of the articles 16 onto the discharge ramp 22, the valve 72 can be actuated so as to cause the motor 62 to move its stop end 66 to the illustrated position blocking the movement of the articles 16. If it is desired next to advance single articles 16 onto the discharge ramp 22, the valve 72 is adjusted so that the stop end 68 moves to the restraining position and the stop end 66 to the retracted position. The valve 72 is again actuated so that the stop ends 66 and 68 reverse and assume the illustrated position which will permit a single article 16 to be released and moved down to the discharge ramp 22. It should be kept in mind that the stop ends 66 and 68 can be spaced further apart and additional articles selectively released if desired.

Briefly summarizing the operation of the apparatus, the articles 16 are installed at the entrance end of the frame 10 in the spaces 70 formed by the sets of rollers 46 and 48. In the meantime the motor 52 will be driving the drive sprocket 34 at whatever speed the transmission 54 is adjusted and the clutch 60 will be engaged. This drives the chain 12 around the idler sprocket 32 with its upper part supported by the center rail 30. As the chain 12 moves along the rail 30, it carries the parts 16 in the spaces 70 towards the discharge end 20. The top side rails 26 through the rollers 50 provide support along with the center rail 30 for the top path of the chain 12, whereas the bottom path is provided with support by the bottom rails 28 along which the rollers 50 rotate as best seen in FIG. 1. Assuming that the gate mechanism 24 is adjusted by the valve 72 so that both of the stop ends 66 and 68 are retracted or in the retracted position, the articles 16 will continuously be transported to the discharge end 20 and onto the ramp 22. To stop this either of the stop ends 66 or 68 can be actuated by adjusting the valve 72 so that one of the stop ends 66 or 68 is in the restraining position. Then the articles 16 will be blocked against further advance and will be rotated by the sets of rollers 46 and 48 as they now rotate with the chain 12 continuing to move and the articles 16 keep moving from space 70 to space 70 or move into the advancing space 70 as the chain 12 continues its motion.

Again assuming that the stop end 68 is in the retracted position if a single article 16 is to be released, the valve 72 is adjusted so that stop end 66 moves to the restraining position and the stop end 68 is retracted, permitting one article 16 to escape onto the discharge ramp 22.

From the foregoing it will be appreciated that the apparatus efficiently and capably handles elongated articles which have a tendency to cock when being restrained through multiple support points but without introducing numerous friction-inducing points of support. Furthermore, more or less conventional components can be used throughout to achieve simplicity and thus minimizing both the initial cost and future maintenance costs.

I claim:

1. Conveyor mechanism comprising a frame, having extending along a length thereof in parallel relation spaced-apart side rails and a center rail positioned between the side rails, an endless conveyor means movably supported on the center rail for movement along an endless path having a horizontally extending upper carrying run, a plurality of long shafts drive connected between the ends thereof at spaced intervals on the conveyor means, a plurality of short shafts drive connected between the ends thereof at spaced intervals on the conveyor means, one of the short shafts being positioned between adjacent long shafts, the short and long shafts having the axes thereof both parallel to each other and extending horizontally in directions normal to the path of movement of the conveyor means, each of the shafts having an article supporting roller mounted thereon adjacent each of its opposite ends for free rotation about the axis of the shaft at opposite sides of the conveyor means, the rollers on the short adjacent shafts being arranged in circumferentially overlapping relation with the rollers in the long shafts so as to support the elongate rodlike articles being conveyed in parallel relationship with the shafts, certain ones of the short shafts also having journaled at the opposite ends thereof support rollers positioned so as to be revolvable on the side rails.

2. Conveyor mechanism comprising a frame having extending along a length thereof in parallel relation spaced-apart side rails extending along a length thereof and a center rail positioned between the side rails and also extending along a length thereof, an endless conveyor chain movably supported on the center rail for movement along an endless path, a plurality of alternately long and short shafts disc connected between the ends thereof to the chain at uniformly spaced intervals, then along with the axes thereof both parallel to each other and normal to the path of movement of the chain, each of the shafts having an article supporting roller mounted thereon adjacent each of its opposite ends for free rotation about the axis of the shaft at opposite sides of the chain, the rollers on the short shafts being arranged is circumferentially overlapping relation with the rollers on the long shafts so as to support the elongate rodlike articles being conveyed in parallel relationship to the shafts, certain ones of the short shafts also having at the opposite ends thereof bearing means revolvable on the side rails to provide support therefor.

3. Article handling apparatus for conveying elongate rodlike articles in a direction normal to their longitudinal axes comprising a frame, an endless conveyor means mounted on said frame for movement along an endless path having a horizontally extending upper carrying run, a plurality of shafts mounted at uniformly spaced intervals on the conveyor means with the axes of the shafts extending horizontally in directions normal to the path of movement of the conveyor means, each of the shafts having a pair of rollers mounted thereon one adjacent each of its opposite ends free rotation about the axis of the shaft at opposite sides of the conveyor means, the rollers on adjacent shafts being transversely offset and circumferentially overlapped with each other to cooperatively support the articles being conveyed upon the rollers on adjacent shafts, means for driving the conveyor means in continuous movement to convey the articles along the carrying run to the discharge end thereof, and gate means on the frame adjacent the discharge end of said carrying run selectively movable from a retracted position clear of the path of articles supported on the rollers to a restraining position in the path of movement of articles supported on the rollers to hold the articles against conveying movement, the rollers on the shafts rolling freely beneath the articles to accommodate continual movement of the conveyor means when the articles are restrained by the gate means.

4. Article handling apparatus for conveying elongate rodlike articles in a direction normal to their longitudinal axes comprising a frame having extending along a length thereof in parallel relation spaced-apart side rails and a center rail between the side rails, an endless conveyor chain movably supported on the center rail for movement along an endless path having a horizontally extending upper carrying run, a plurality of alternately long and short shafts drive connected to the chain at uniformly spaced intervals along the chain with the axes of the shafts being both parallel to each other and extending normal to the path of movement of the chain, each of the shafts having an article supporting roller mounted thereon adjacent each of its opposite ends for free rotation about the axis of the shaft at opposite sides of the chain, the rollers on short shafts being arranged in circumferentially overlapping relation with the rollers on the long shafts, so as to support the elongate rodlike articles being conveyed in parallel relationship to the shafts, certain ones of the short shafts also having at the opposite ends thereof bearing means revolvable on the side rails to provide support therefor, means for driving the chain in continuous movement to convey the articles along the carrying run to a discharge end thereof, and gate means positioned relative to the frame adjacent the discharge end of the carrying run selectively movable from a retracted position clear of the path of articles to a restraining position in the path of movement of articles supported on the rollers to hold the articles against conveying movement, the rollers on the shafts rolling freely beneath the articles to accommodate continual movement of the chain when the articles are restrained by the gate means.

5. Article handling apparatus for conveying elongate rodlike articles in a direction normal to their longitudinal axes comprising a frame having extending along a length thereof in parallel relation spaced-apart side rails and a center rail positioned between the side rails, an endless conveyor means movably supported on the center rail for movement along an endless path having a horizontally extending upper carrying run, a plurality of long shafts drive connected between the ends thereof at spaced intervals on the conveyor means, a plurality of short shafts drive connected between the ends thereof at spaced intervals on the conveyor means, one of the short shafts being positioned between adjacent long shafts, the short and long shafts having the axes thereof both parallel to each other and extending horizontally in directions normal to the path of movement of the conveyor means, each of the shafts having an article supporting roller mounted thereon adjacent each of its opposite ends for free rotation about the axis of the shaft at opposite sides of the conveyor means, the rollers on the short shafts being arranged in circumferentially overlapping relation with the rollers on the long shafts so as to support the elongate rodlike articles being conveyed in parallel relationship with the shafts, certain ones of the short shafts also having journaled at the opposite ends thereof support rollers positioned so as to be revolvable on the side rails means for driving the conveyor means in continuous movement to convey the articles along the carrying run to the discharge end thereof, and gate means on the frame adjacent the discharge end of the carrying run selectively movable from a retracted position clear of the path of articles to a restraining position in the path of movement of articles supported on the rollers to hold the articles against conveying movement, the rollers on the shafts rolling freely beneath the articles to accommodate continual movement of the conveyor means when the articles are restrained by the gate means.

6. The apparatus described in claim 3 wherein the gate means is also operative to allow selected quantities of the articles to pass.

7. The apparatus described in claim 6 wherein the gate means includes a pair of stops, one stop being proximate and the other remote from the discharge end of the carrying run, selectively operable means for simultaneously maneuvering one stop to the restrained position and the roller stop to the retracted position so that the articles can be stopped and also so that when the remote stop is maneuvered to the restraining position the other stop in being maneuvered to the retracted position permits the article restrained between the stops to pass.

8. The apparatus described in claim 5 wherein the gate means includes a pair of stops, one stop being proximate and the other stop remote from the discharge end of the carrying run, selectively operable means for simultaneously maneuvering one stop to the restraining position and the other stop to the retracted position so that articles can be stopped and also so that a certain number of articles can be entrapped between the stops and allowed to separately pass.